US012038196B2

(12) United States Patent
Leezer et al.

(10) Patent No.: US 12,038,196 B2
(45) Date of Patent: Jul. 16, 2024

(54) WINDOW AIR CONDITIONING UNIT ANTI-TIP BRACKET ASSEMBLY

(71) Applicant: Midea Group Co., Ltd., Foshan (CN)

(72) Inventors: David Leezer, LaGrange, KY (US); Adam Schultz, Prospect, KY (US); Brian Langness, Shelbyville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 18/230,562

(22) Filed: Aug. 4, 2023

(65) Prior Publication Data

US 2023/0375222 A1 Nov. 23, 2023

Related U.S. Application Data

(63) Continuation of application No. 17/519,061, filed on Nov. 4, 2021, now Pat. No. 11,739,979, which is a continuation of application No. 16/862,656, filed on Apr. 30, 2020, now Pat. No. 11,168,920.

(51) Int. Cl.

| | |
|---|---|
| ***F24F 13/32*** | (2006.01) |
| ***E06B 7/03*** | (2006.01) |
| ***F24F 1/027*** | (2019.01) |

(52) U.S. Cl.

CPC ................ *F24F 13/32* (2013.01); *E06B 7/03* (2013.01); *F24F 1/027* (2013.01); *F24F 2221/20* (2013.01)

(58) Field of Classification Search

CPC .. F24F 13/32; F24F 1/027; F24F 1/003; F24F 2221/20; E06B 7/03

See application file for complete search history.

(56) References Cited

U.S. PATENT DOCUMENTS

| | | | |
|---|---|---|---|
| 399,491 | A | 3/1889 | Del piakko |
| 1,954,017 | A | 4/1934 | Manning |
| 2,234,753 | A | 3/1941 | Frazer |
| 2,268,451 | A | 12/1941 | Hull |
| 2,294,664 | A | 9/1942 | Hubbard |
| 2,320,436 | A | 6/1943 | Hull |
| 2,436,713 | A | 2/1948 | Cody |
| 2,472,792 | A | 6/1949 | Cohler |
| 2,568,968 | A | 9/1951 | Perrin |
| 2,604,763 | A | 7/1952 | Lipman |
| 2,608,148 | A | 8/1952 | Shapiro |
| 2,708,833 | A | 5/1955 | Nigro |
| 2,814,244 | A | 11/1957 | Hord |
| 2,818,793 | A | 1/1958 | Hord |

(Continued)

FOREIGN PATENT DOCUMENTS

| | | |
|---|---|---|
| CN | 102455025 A | 5/2012 |
| CN | 209689075 U | 11/2019 |

(Continued)

OTHER PUBLICATIONS

Climaloc; "Top & Sides Door Seal Spring-Loaded Kit"; https://climalocsolutions.com/product/top-sides-door-sealspring-loaded-kit-2/; Climaloc; dated Nov. 2, 2022.

(Continued)

*Primary Examiner* — Eret C McNichols
(74) *Attorney, Agent, or Firm* — Gray Ice Higdon

(57) ABSTRACT

An anti-tip bracket assembly for a window air conditioning unit is disclosed, and more particularly, an anti-tip bracket assembly that pertains to securing a window air conditioning unit within a window assembly while allowing a user to open and close the window assembly in a safe and convenient manner is disclosed.

20 Claims, 7 Drawing Sheets

(56) References Cited

U.S. PATENT DOCUMENTS

| | | | | |
|---|---|---|---|---|
| 2,925,026 | A * | 2/1960 | Schuster | F24F 1/04 454/203 |
| 2,935,284 | A * | 5/1960 | Reeves | F24F 13/32 248/208 |
| 3,030,873 | A * | 4/1962 | Metcalfe | F24F 1/04 454/203 |
| 3,134,319 | A | 5/1964 | Marsteller | |
| 3,271,972 | A | 9/1966 | Knight | |
| 3,318,226 | A | 5/1967 | Ulich | |
| 3,394,910 | A * | 7/1968 | Ulich | F24F 13/00 248/236 |
| 3,476,033 | A * | 11/1969 | Appel | F24F 13/20 62/262 |
| 3,481,264 | A * | 12/1969 | Ulich | F24F 1/04 454/203 |
| 3,491,549 | A * | 1/1970 | Oglesby | F24F 13/00 62/262 |
| 3,552,470 | A * | 1/1971 | Metcalfe | F24F 1/04 454/204 |
| 3,554,476 | A | 1/1971 | Gaylor | |
| 3,576,114 | A | 4/1971 | Sharp et al. | |
| 3,698,208 | A | 10/1972 | Williams | |
| 3,698,308 | A | 10/1972 | Navara | |
| 3,861,283 | A | 1/1975 | Shaner | |
| 3,911,803 | A | 10/1975 | Kong | |
| 4,086,886 | A | 5/1978 | Edmaier | |
| 4,152,844 | A | 5/1979 | Materniak | |
| 4,203,302 | A | 5/1980 | Lapeyre | |
| 4,334,461 | A | 6/1982 | Ferguson | |
| 5,027,614 | A | 7/1991 | Mori | |
| 5,050,831 | A | 9/1991 | Joyal | |
| 5,167,131 | A | 12/1992 | Karkhanis | |
| 5,253,485 | A | 10/1993 | Kennedy | |
| 5,290,343 | A | 3/1994 | Morita | |
| 5,365,992 | A | 11/1994 | Swain | |
| 5,582,025 | A | 12/1996 | Dubin et al. | |
| 5,823,289 | A | 10/1998 | Csomos | |
| 5,979,172 | A | 11/1999 | Teller | |
| 5,979,533 | A * | 11/1999 | Dupuie | F24F 1/0003 160/84.06 |
| 6,173,930 | B1 | 1/2001 | Arbucci | |
| 6,257,013 | B1 | 7/2001 | Murray | |
| 6,568,201 | B1 | 5/2003 | Cur et al. | |
| 6,767,278 | B1 | 7/2004 | Peterson | |
| 7,121,105 | B1 | 10/2006 | Rais | |
| 7,296,424 | B2 | 11/2007 | Thompson | |
| 7,332,019 | B2 | 2/2008 | Bias | |
| 7,350,759 | B1 | 4/2008 | Gray | |
| 7,753,334 | B2 * | 7/2010 | Schreiber | E04G 21/3261 182/60 |
| 7,854,141 | B1 | 12/2010 | Breen | |
| 7,975,441 | B2 | 7/2011 | McCarriston | |
| 8,091,844 | B1 | 1/2012 | Bragg | |
| 8,104,240 | B2 | 1/2012 | McCarriston | |
| 8,578,728 | B2 | 11/2013 | Cho | |
| 8,584,998 | B1 * | 11/2013 | Peterson | F24F 13/32 182/62 |
| 9,163,854 | B2 * | 10/2015 | Arbucci | E04B 1/388 |
| 9,303,895 | B1 | 4/2016 | Grant | |
| 9,447,916 | B2 * | 9/2016 | Darby | F24F 13/32 |
| D782,289 | S | 3/2017 | Darby | |
| 9,605,870 | B2 | 3/2017 | Darby | |
| 9,909,712 | B1 | 3/2018 | Darby | |
| 9,938,044 | B2 | 4/2018 | Gamboa | |
| 9,982,909 | B1 | 5/2018 | Perez et al. | |
| 10,203,130 | B2 | 2/2019 | Gardikis, Sr. | |
| 10,203,180 | B2 | 2/2019 | Miller | |
| 10,295,221 | B2 | 5/2019 | Zhang | |
| 10,359,212 | B2 | 7/2019 | Darby | |
| 10,401,043 | B2 | 9/2019 | Li | |
| 10,520,206 | B2 * | 12/2019 | Xu | F24F 13/12 |
| 10,739,018 | B2 | 8/2020 | Baumann et al. | |
| 10,900,689 | B2 | 1/2021 | Weiner | |
| 11,168,920 | B1 | 11/2021 | Leezer et al. | |
| 11,397,023 | B2 | 7/2022 | Xing et al. | |
| 11,415,329 | B2 | 8/2022 | Liu et al. | |
| 11,441,791 | B2 | 9/2022 | Lei et al. | |
| 11,441,792 | B2 | 9/2022 | Liang et al. | |
| 2001/0032545 | A1 | 10/2001 | Goto | |
| 2003/0097854 | A1 * | 5/2003 | Cur | F24F 1/027 62/262 |
| 2003/0110789 | A1 | 6/2003 | Cur | |
| 2005/0028545 | A1 | 2/2005 | Hebert | |
| 2006/0021359 | A1 | 2/2006 | Hur | |
| 2007/0023592 | A1 | 2/2007 | Makoso | |
| 2007/0068185 | A1 | 3/2007 | Thompson | |
| 2007/0107329 | A1 * | 5/2007 | Ferrara | E06B 9/04 52/203 |
| 2007/0137237 | A1 * | 6/2007 | Rais | F24F 1/027 62/262 |
| 2008/0053309 | A1 | 3/2008 | Woodruff | |
| 2008/0104989 | A1 | 5/2008 | Movshovitz | |
| 2010/0077924 | A1 | 4/2010 | Zhao | |
| 2010/0197214 | A1 | 8/2010 | Geremia, Sr. | |
| 2010/0229585 | A1 | 9/2010 | Bradford | |
| 2010/0326103 | A1 | 12/2010 | Stamm | |
| 2012/0137499 | A1 | 6/2012 | Agnihotri | |
| 2012/0274188 | A1 | 11/2012 | Shiborino | |
| 2013/0104581 | A1 | 5/2013 | Consoli | |
| 2013/0153744 | A1 | 6/2013 | Jin | |
| 2013/0327509 | A1 | 12/2013 | Michitsuji | |
| 2014/0020421 | A1 | 1/2014 | Gallo | |
| 2014/0076506 | A1 | 3/2014 | Olivas | |
| 2014/0090334 | A1 | 4/2014 | Darby | |
| 2014/0311063 | A1 | 10/2014 | McIntyre | |
| 2015/0034784 | A1 | 2/2015 | Darby | |
| 2015/0097096 | A1 | 4/2015 | Arbucci | |
| 2015/0211802 | A1 | 7/2015 | Yokozeki | |
| 2016/0033166 | A1 | 2/2016 | Hebert | |
| 2016/0097547 | A1 | 4/2016 | Selg | |
| 2017/0191763 | A1 | 7/2017 | Xu | |
| 2017/0284683 | A1 | 10/2017 | Gallo | |
| 2017/0297768 | A1 | 10/2017 | Gamboa | |
| 2017/0328596 | A1 * | 11/2017 | Darby | F24F 13/32 |
| 2018/0023842 | A1 * | 1/2018 | Gardikis, Sr. | F16M 13/02 248/674 |
| 2018/0180305 | A1 | 6/2018 | Zhang | |
| 2019/0056143 | A1 | 2/2019 | Zhang | |
| 2019/0063760 | A1 | 2/2019 | Li | |
| 2019/0212032 | A1 | 7/2019 | Martinez Galvan | |
| 2020/0124296 | A1 * | 4/2020 | Baumann | F24F 1/027 |
| 2020/0248911 | A1 * | 8/2020 | Lei | F24F 13/32 |
| 2020/0333021 | A1 | 10/2020 | Martinez Galvan | |
| 2020/0363075 | A1 | 11/2020 | Bradford | |
| 2021/0010688 | A1 | 1/2021 | Biasotti et al. | |
| 2021/0078118 | A1 | 3/2021 | Li et al. | |
| 2021/0088251 | A1 | 3/2021 | Galvan et al. | |
| 2021/0164667 | A1 | 6/2021 | Yu et al. | |
| 2021/0180828 | A1 * | 6/2021 | Xing | F16M 13/022 |
| 2021/0207819 | A1 | 7/2021 | Zhang et al. | |
| 2021/0222891 | A1 | 7/2021 | Rao et al. | |
| 2021/0325054 | A1 * | 10/2021 | Zhao | F24F 13/32 |
| 2021/0355750 | A1 | 11/2021 | Liang et al. | |
| 2021/0356145 | A1 | 11/2021 | Lei et al. | |
| 2021/0356146 | A1 | 11/2021 | Zhang | |
| 2021/0404749 | A1 | 12/2021 | Wexler | |
| 2022/0057109 | A1 | 2/2022 | Leezer | |
| 2023/0026722 | A1 * | 1/2023 | Yu | F24F 13/32 |
| 2023/0194123 | A1 | 6/2023 | Palomäki | |
| 2023/0213215 | A1 * | 7/2023 | DeRossett | F24F 13/32 62/262 |
| 2023/0375222 | A1 * | 11/2023 | Leezer | F24F 1/027 |

FOREIGN PATENT DOCUMENTS

| | | | |
|---|---|---|---|
| WO | 2020038239 | A1 | 2/2020 |
| WO | 2020228408 | A1 | 11/2020 |

(56) References Cited

OTHER PUBLICATIONS

Home Depot; "How to Install a Window Air Conditioner"; retrieved from https://www.homedepot.com/c/ah/how-to-install-a-window-air-conditioner/9ba683603be9fa5395fab90e6808e44; retrieved on Nov. 2, 2022.
Related Applications Transmittal dated Aug. 4, 2023.
McNichols, Eret C., United States Patent and Trademark Office, Non-Final Office Action issued in U.S. Appl. No. 17/519,061, 18 pages, dated Sep. 30, 2022.
McNichols, Eret C., United States Patent and Trademark Office, Notice of Allowance issued in U.S. Appl. No. 17/519,061, 40 pages, dated Apr. 13, 2023.

* cited by examiner

WINDOW AIR CONDITIONING UNIT ANTI-TIP BRACKET ASSEMBLY

BACKGROUND

Window installed air conditioning units are common home appliances nowadays. A traditional window air conditioning unit is typically placed on a mounting bracket on a horizontal windowsill when a window sash is open. The window sash is then partially closed to rest on the top surface of the unit outer casing, and the unit is typically attached rigidly to the window sash frame via a flange or a shroud to be affixed in the window opening. Such a "window-defined" enclosure for the traditional window air conditioning unit requires the window sash to remain in place and in contact with the top of the air conditioning unit at all times. Consequently, the window sash cannot be opened during times of the year when it is desired to get fresh air from outside, or whenever a user would prefer to open the window instead of running the air conditioning unit. Also, the window sash cannot be closed beyond the top of the window air conditioning unit, which means the noise generated by the window air conditioning unit outdoor component including the compressor and the fan is always a problem for consumers.

Embodiments herein disclose a new window air conditioning unit design that allows consumers to open or close the window after installation. Such embodiments also include a safety device that is easy to install by consumers, eliminates the risk of the unit falling, and also permits a window sash to be raised and lowered freely by consumers.

SUMMARY

The present apparatus relates to an anti-tip bracket assembly for insertion across a window assembly, and more particularly to an anti-tip bracket assembly for a window air conditioning unit design having a window slot between an indoor portion and an outdoor portion, into which a window sash may be lowered. The anti-tip bracket assembly may include one or more brackets that can be inserted into the vertical side window tracks of the window assembly and affixed to the window air conditioning unit, thus preventing the unit from falling into or out of the window. The brackets each has a first end and a second end, and each end may be arranged to mate within a vertical side window track with different dimensions.

The present disclosure provides an improved anti-tip bracket assembly with major advantages including: ease of installation and adjustability to fit into various sized window openings; maintaining the appearance of the window air conditioning unit; avoiding the possible damages to the structure of the window sash; and allowing for the window to be opened or closed after the window air conditioning unit is installed. The apparatus may also work with other similar industrial designs of window air conditioning units, achieving similar advantages as outlined above.

In some embodiments, an anti-tip bracket assembly for securing a window air conditioning unit in a window assembly is disclosed. The window assembly may have at least one vertically operable window sash, a horizontal windowsill, and two vertical side window tracks. The window air conditioning unit may have a window slot to separate an indoor portion from an outdoor portion, and the window slot is for receiving the at least one vertically operable window sash. The anti-tip bracket assembly may comprise at least one bracket with a first end and a second end, and the first end and the second end is arranged to be received within the vertical side window track to provide support to the window air conditioning unit. The anti-tip bracket assembly may also comprise a base affixed in the window slot of the window air conditioning unit, and the at least one bracket is adjustably affixed in the base.

In some embodiments, the disclosure may also comprise a method of supporting a window air conditioning unit within a window assembly on a main mounting bracket. The window assembly may have at least one vertically operable window sash, a horizontal windowsill, and two vertical side window tracks. The window air conditioning unit may have a window slot to separate an indoor portion from an outdoor portion, and the window slot is for receiving the vertically operable window sash. The method may comprise one or more of the following steps in this or an alternative order: providing an anti-tip bracket assembly in the window slot of the window air conditioning unit, the anti-tip bracket assembly further comprising a base, at least one bracket having a first end and a second end, and at least one sealing member; raising the window sash to a first position and installing the main mounting bracket; placing the window air conditioning unit onto the main mounting bracket; installing the at least one sealing member; inserting the first end of the at least one bracket into the vertical side window track; affixing the at least one bracket into the base; and lowering the window sash to a second position.

In some embodiments, an anti-tip bracket assembly for securing a window air conditioning unit in a window assembly is disclosed. The window assembly may have at least one vertically operable window sash, a horizontal windowsill, and two vertical side window tracks. The window air conditioning unit may have a window slot to separate an indoor portion from an outdoor portion, and the window slot is for receiving the at least one vertically operable window sash. The anti-tip bracket assembly may comprise at least one bracket with a first end and a second end, and the first end and the second end is arranged to be received within the vertical side window track to provide support to the window air conditioning unit. The anti-tip bracket assembly may also comprise a base affixed in the window slot of the window air conditioning unit, and the at least one bracket is adjustably affixed in the base. The window air conditioning unit allows the window assembly to be adjustable between a first position and a second position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present disclosure is provided in the following written description of various embodiments of the disclosure, illustrated in the accompanying drawings, and defined in the appended claims.

DETAILED DESCRIPTION

Figure 1:
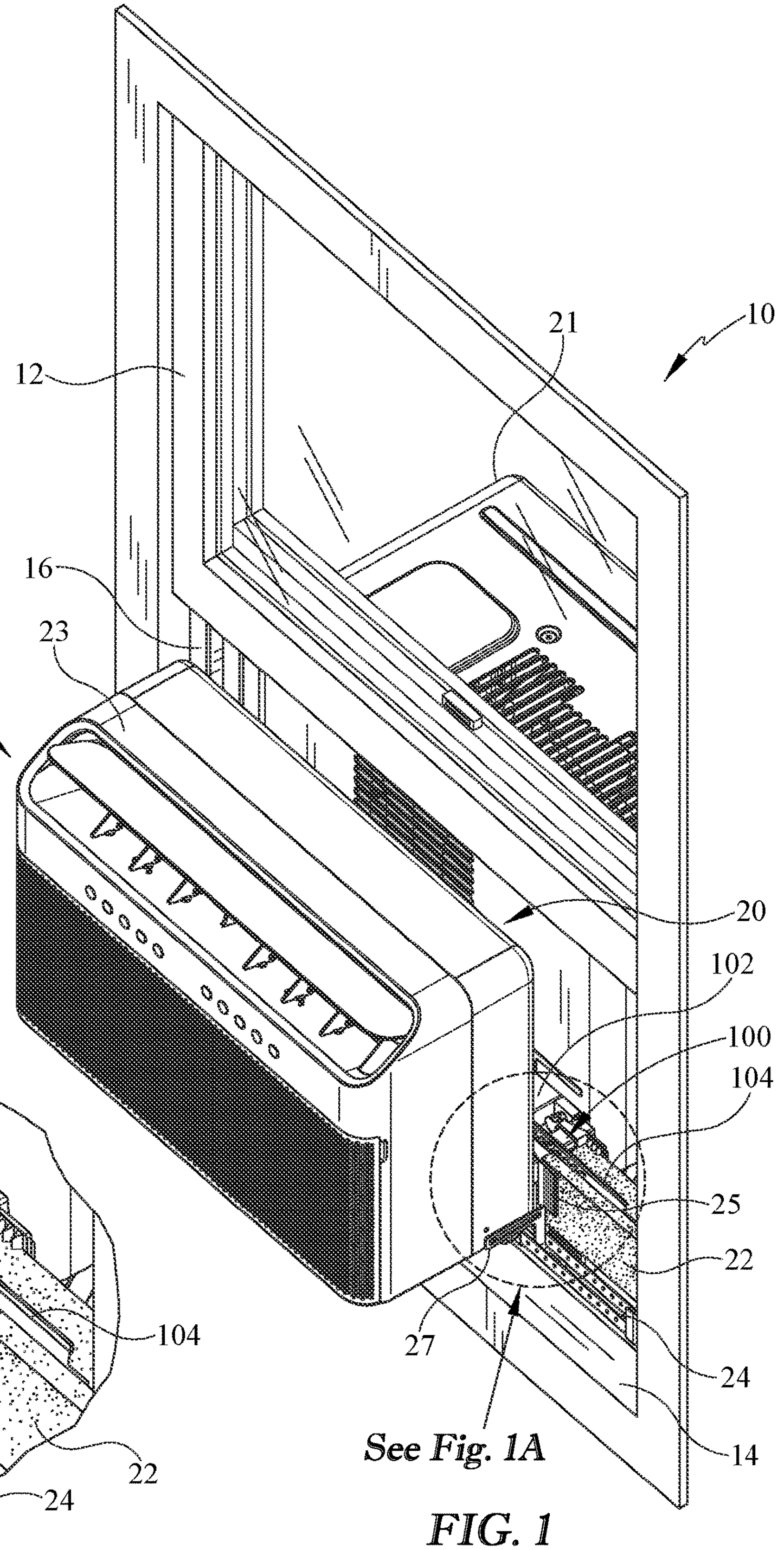
FIG. 1 is a perspective view of a window air conditioning unit installed using an anti-tip bracket assembly in accordance with various embodiments, viewed from the inside of a room with the window open.

It is to be understood that a window air conditioning unit bracket assembly is not limited in its application to the details of construction and the arrangement of components set forth in the following description or illustrated in the exemplary drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to direct physical or mechanical connections or couplings.

Turning now to the drawings and in particular FIGS. 1-7, wherein like numbers denote like parts throughout the several views, an anti-tip bracket assembly 100 in accordance with various embodiments may be used for a window air conditioning unit 18 mounted in a window assembly 10. The type, size, and shape of the window air conditioning unit 18 may be varied while remaining within the scope of the present disclosure. In some embodiments, as shown in the FIGS. 1, 2, 3, and 6, the window air conditioning unit 18 may be U-shaped with a window slot 20 between an outdoor portion 21, which is disposed outside of a room, and an indoor portion 23, which is disposed inside of the room. The window slot 20 may allow the window assembly 10 to be closed into the overall casing structure of the window air conditioning unit 18. The overall casing structure may be the outer casing perimeter adapted to enclose all the components of the window air conditioning unit 18, including but not limited to, the evaporator coil, the condenser coil, the compressor, the fan, the motor, etc. In the embodiments shown, the casing may include two main components; a casing for the indoor portion 23 and a casing for the outdoor portion 21.

Figure 2:
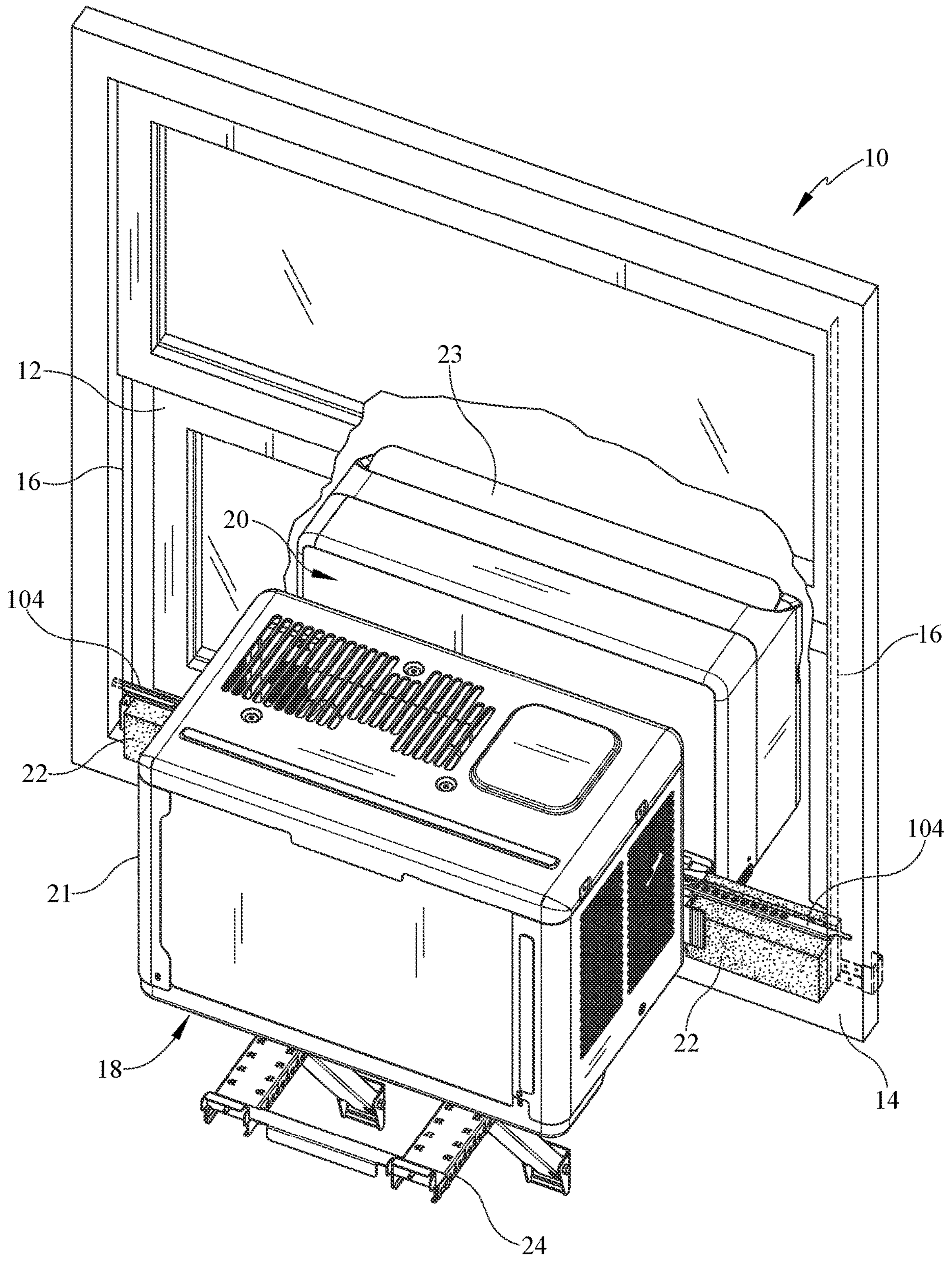
FIG. 2 is a perspective view of the apparatus of FIG. 1, viewed from the outside of a room with the window closed.

In some embodiments, as best shown in FIGS. 1 and 2, the window assembly 10 may include a vertically operable window sash 12, a horizontal windowsill 14, and a pair of vertical side window tracks 16 for slidably receiving the vertical side faces of the window sash 12. Thus, the window sash 12 may be vertically slid up and down by a user. Basically, any size window is acceptable, but ideally, the window assembly 10 may be a standard double hung window with a width of approximately 22 to 36 inches and a height of approximately 13.5 inches.

Figure 1A:
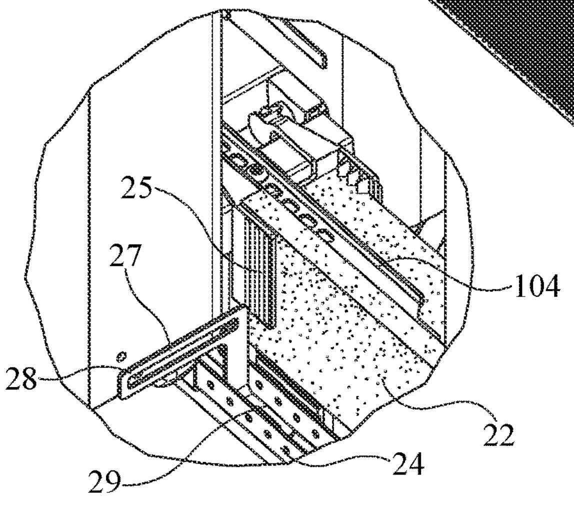
FIG. 1A is an enlarged view of a portion of the anti-tip bracket assembly and an open window bracket anchored to a main mounting bracket.

Generally, the window air conditioning unit 18 may be installed upon the horizontal windowsill 14 of the window assembly 10, and a main mounting bracket 24 may be installed to help support the window air conditioning unit 18 within the window assembly 10. In some embodiments, at least one open window bracket 27 may be optionally installed to further secure the window air conditioning unit 18 to the main mounting bracket 24. As shown in FIGS. 1 and 1A, a first end 28 of the open window bracket 27 may be anchored to the outer casing of the indoor portion 23 of the window air conditioning unit 18, and a second end 29 of the open window bracket 27 may be anchored to the main mounting bracket 24. In some other embodiments, with the first end 28 anchored to the outer casing of the indoor portion 23, the second end may be anchored to the horizontal windowsill 14.

In some embodiments, there may be also at least one sealing member 22 to close off the remaining gap between the lowered window sash 12 and the horizontal windowsill 14 after installation. The sealing member 22 may be, for example, in an elongated rectangular configuration and made from material suitable for sealing window gaps, for example, foam. In some embodiments, as shown in FIGS. 1, 2, 6, and 7, the sealing member 22 may be installed on each of two corresponding side arms 25 on both sides of the window air conditioning unit 18. In some embodiments, the side arm 25 may be rotatably hinged so that the side arm 25 may be rotated into the window slot 20 of the window air conditioning unit 18 for storage or transportation. In some other embodiments, the side arm 25 may be coupled to the window air conditioning unit 18 in other feasible ways, such as, for example, clamping, screws, plug-in connectors, tongue-and-groove coupling, pin-and-slot, dovetail grooves, spring detents, and so forth.

Figures 4, 5:
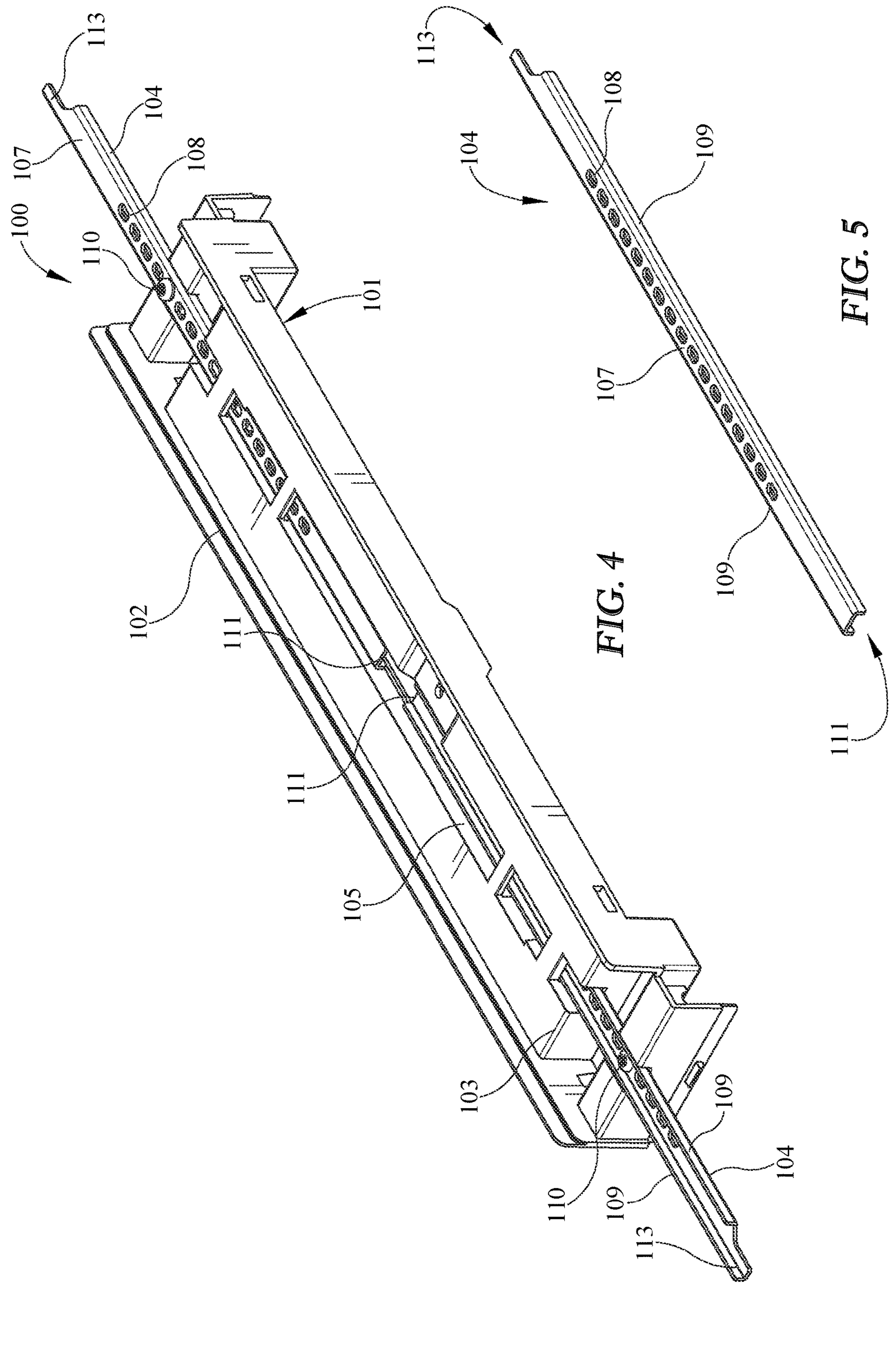
FIG. 4 is a perspective view of an anti-tip bracket assembly in accordance with various embodiments.
FIG. 5 is a perspective view of a bracket of the anti-tip bracket assembly of FIG. 4.

As mentioned above, the anti-tip bracket assembly 100 may be used to minimize the risk of the window air conditioning unit 18 falling or tipping from the window assembly 10 during installation or after installation due to external forces acting on the unit. FIG. 4 illustrates the anti-tip bracket assembly 100 comprising a base 102 and at least one bracket 104 in accordance with various embodiments. In some embodiments, the base 102 may include a lower section 101 and an upper section 103. The lower section 101 may be adapted to be affixed in the window slot 20 of the window air conditioning unit 18, and the upper section 103 may have a bracket guide track 105 for receiving the at least one bracket 104.

In some embodiments, the bracket 104, as shown in FIG. 5, may comprise a planar face 107, a first end 111, and a second end 113. In some embodiments, one bracket 104 may work with the other bracket 104, such that the two brackets 104 may be slidably received within the bracket guide track 105 of the base 102 to allow a user to vary the length of the extended part of each bracket 104 out of the overall casing structure of the window air conditioning unit 18 in order to fit into the window assembly 10 of different widths. The bracket 104 may be extended until the end of each of them is fully located into the vertical side window tracks 16 to provide sufficient support. In some embodiments, the bracket 104 may be an elongated rectangular shape. In these embodiments, as shown in FIG. 4, the bracket 104 may also include side lips 109 along the elongated direction so that the bracket 104 may be arranged in a way that one bracket 104 is upside-down to the other bracket so as to be slidably received into each other in the bracket guide track 105 of the base 102 to save horizontal space for storage or transportation. In some embodiments, only one bracket 104 may be used. The bracket 104 may have parts or pieces that are movable or extendable so as to adjust length. The bracket 104 may be fabricated of an essentially rigid material, for example, an extruded metal such as steel or aluminum.

In order to affix the bracket 104 to the base 102, various securement arrangements may be provided. In some embodiments, the bracket 104 may be pre-stamped to form a plurality drilled or punched holes or slots 108 on the planar face 107 for anchoring a fastener 110 through to affix the bracket 104 to the base 102. The fastener 110 secured into the base 102 may preclude motion thereof with respect to the base 102. The specific slot 108 that the fastener 110 can go through may be determined based on the width of the window assembly 10. The fastener 110 may be a bolt or a screw of different sizes and types (e.g., slot, cross, hex, Philips, etc.). Various other fasteners are possible, including, for example, ball detents, movable pins, spring-loaded pins, posts, tongue-and-groove, and the like. In the example shown in FIGS. 4 and 6, the base 102 may have two pre-formed pilot holes at the two ends of the upper section 103 for securing two corresponding ½ inch Philips screws. In some embodiments, the bolt or the screw may be factory pre-installed. It should be understood that the fastener 110 should be fastener tight to prevent inadvertent loosening of the bracket 104.

Figure 6:
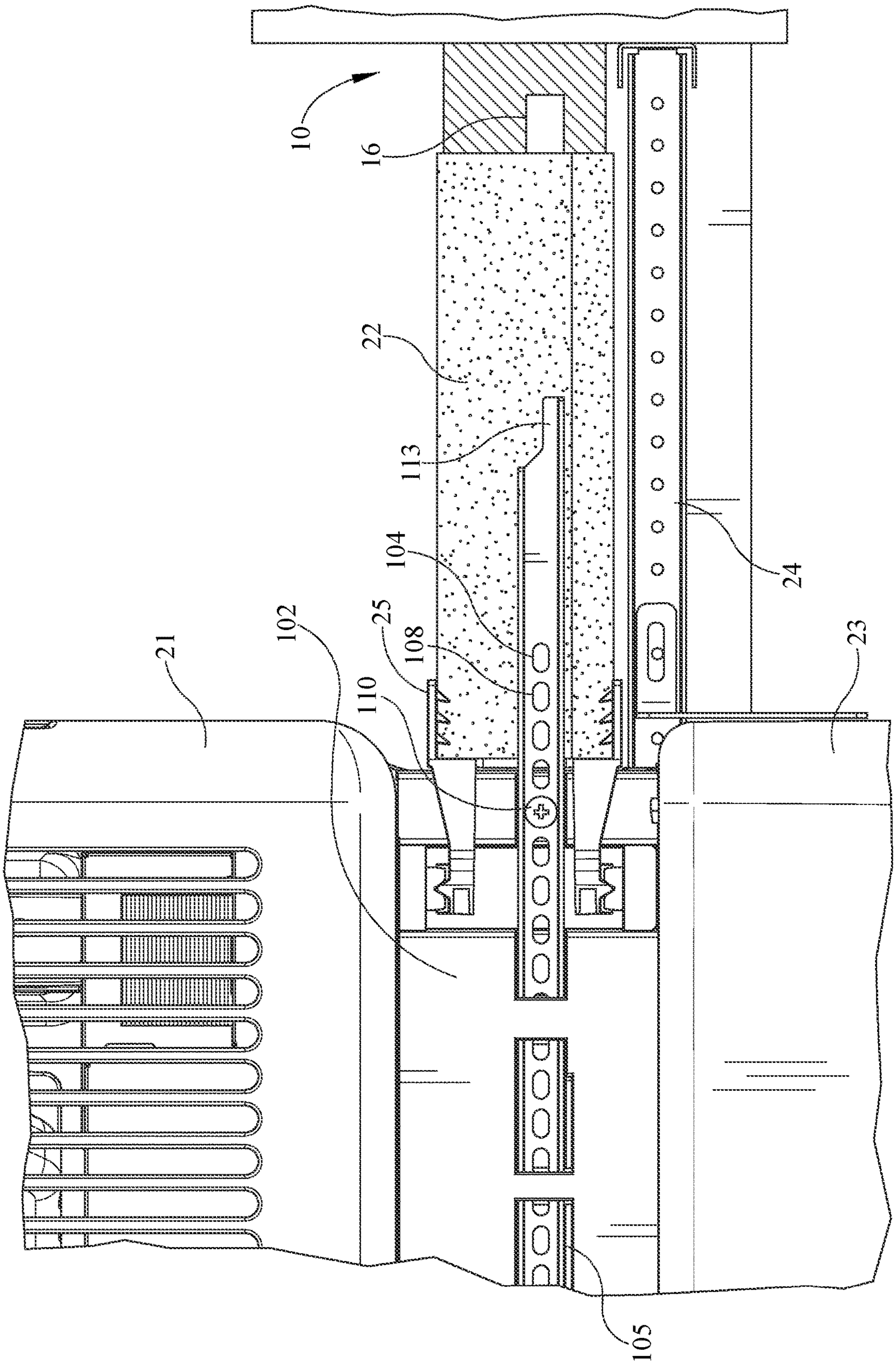
FIG. 6 is a top view of an anti-tip bracket assembly installed in a vertical side window track in accordance with various embodiments, with a bracket of the anti-tip bracket assembly half-way extended.
Figure 7:
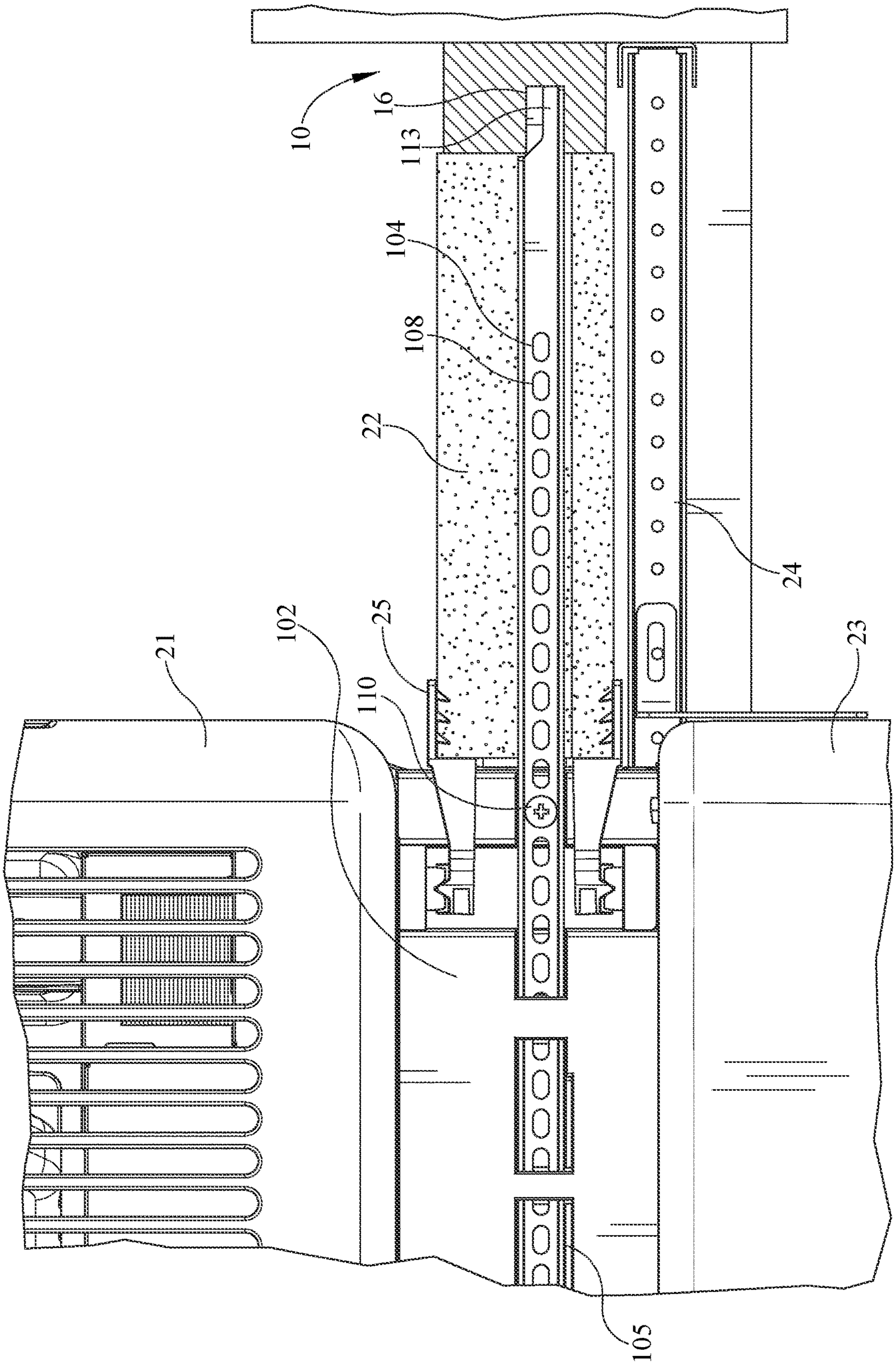
FIG. 7 is a top view of the anti-tip bracket assembly of FIG. 6 with the bracket of the anti-tip bracket assembly fully extended into the vertical side window track.

In some embodiments, the second end 113 may be fabricated or molded into a smaller shape. For example, as shown in FIGS. 4, 5, and 6, the second end 113 may have a smaller cross-sectional dimension to better fit into a narrower window track 16. Other smaller bracket end shapes may also be acceptable. Accordingly, a user may choose to extend either the first end 111 with a larger bracket end shape, or the second end 113 with a smaller bracket end shape into the window track 16 based on the track width. For example, for the window track 16 with a width of ½ inch or smaller, the user may remove and re-orient bracket 104 so the smaller second end 113 may be inserted into the window track 16. It should be noted that a certain side of the bracket 104 may preferably face the indoor side when the smaller end is inserted into the window track 16 to distribute the torque load to the stronger side of the bracket 104 to minimize the impact by the thinner structure of the smaller end. For example, the bracket 104 may be suggested to be installed in a configuration as shown in FIGS. 1, 2, 6, and 7 to avoid the potential damage to the structure of the smaller second end 113.

In some embodiments, the part of the bracket 104 that extends out of the overall casing structure of the window air conditioning unit 18 may be accommodated in a pre-formed groove on a top surface of the sealing member 22, as best shown in FIG. 1A, to avoid changing the appearance of the window air conditioning unit 18. This may facilitate the window to close, and doesn't alter the appearance when viewed from the inside of a room.

Figure 3:
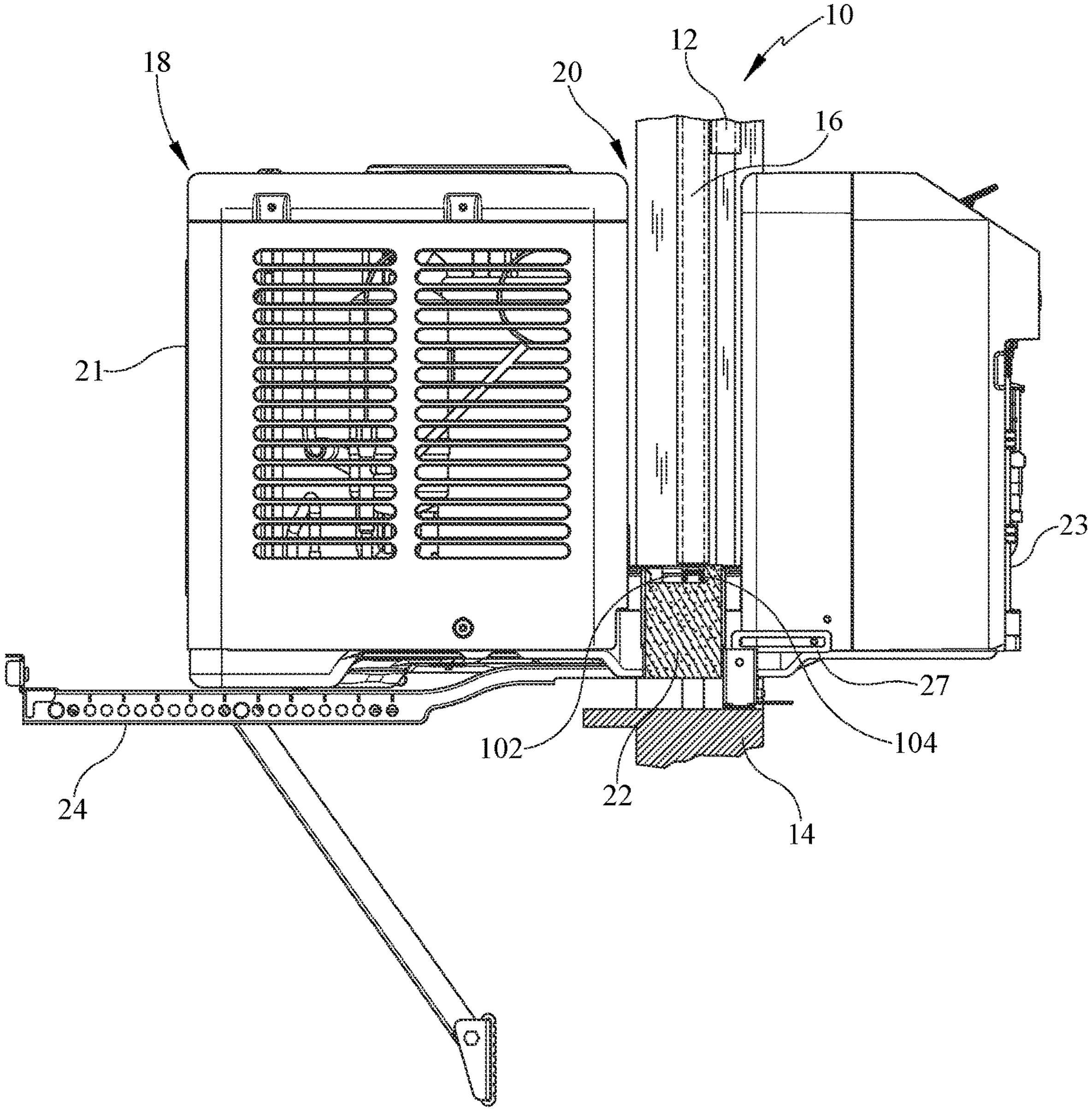
FIG. 3 is a side elevation view of the apparatus of FIG. 1.

With the anti-tip bracket assembly 100 properly installed, the window air conditioning unit 18 may bear its weight on the main mounting bracket 24 and against the window track 16 which is a part of the window assembly 10. The bracket 104 thereof may provide a resistive support to the torque of the window air conditioning unit 18 biased thereagainst by the first end 111 or the second end 113 positioned in the two vertical side window tracks 16. With such a supportive arrangement, the window air conditioning unit 18 may still remain resting safely within the window assembly 10 when the window sash 12 is lowered to "close the window". In this way, the noise level caused by the outdoor portion 21 including the compressor and the fan may be reduced with the window sash 12 working as a sound barrier between the outdoor portion 21 and the inside of the room. Also, the window sash 12 may be raised to "open the window" to allow fresh air into the room. As the burden supporting of the window air conditioning unit 18 is transferred to the main mounting bracket 24 and the aggregate structure of the window assembly 10 through the window track 16 instead of supporting and maintaining the load only by the window sash 12, such an arrangement may also prevent the distortive "bowing" or "bruising" of the window sash 12. FIG. 1 shows the window assembly 10 in a first position (the window sash 12 is raised outside the window slot 20 and above the overall casing structure of the window air conditioning unit 18), and FIGS. 2 and 3 show the window assembly 10 in a second position (the window sash 12 is lowered inside the window slot 20 and rests on the top surface of the sealing member 22 below the top of the overall casing structure).

Figure 8:
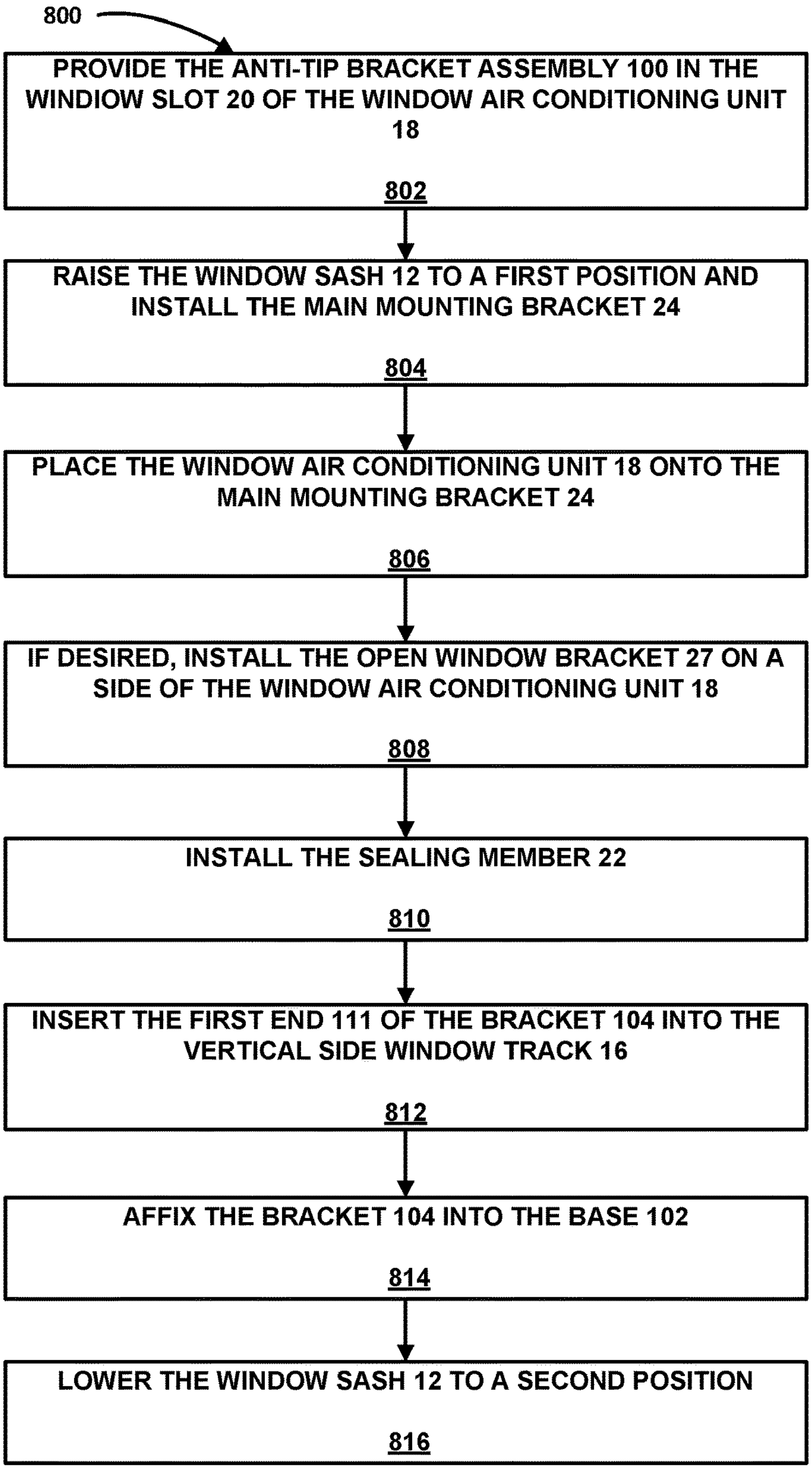
FIG. 8 is a flow chart of an example method of installing an anti-tip bracket assembly to support a window air conditioning unit in accordance with various embodiments.

Having described the structural components of the anti-tip bracket assembly 100, a method of installation will now be described. FIG. 8 illustrates a flowchart of an example sequence 800 of installation of the anti-tip bracket assembly 100 in accordance with various embodiments. Sequence 800 begins in block 802 by providing the anti-tip bracket assembly 100 in the window slot 20 of the window air conditioning unit 18. The anti-tip bracket assembly 100 may comprise a base 102, at least one bracket 104 having a first end 111 and a second end 113, and at least one sealing member 22. Block 804 involves raising the window sash 12 to a first position to install the main mounting bracket 24 within the window assembly 10. In block 806, the window air conditioning unit 18 may be placed on the top of the main mounting bracket 24 within the window assembly 10. If desired, block 808 involves installing one or more open window brackets 27 on a side of the window air conditioning unit 18. This prevents the window air conditioning unit 18 from moving horizontally. Then, in block 810, with the window sash 12 still open, the sealing member 22 may be installed to close off the remaining gap between the lowered window sash 12 and the horizontal windowsill 14.

In block 812, the first end 111 of the bracket 104 may be inserted into the vertical side window track 16. It should be understood that the window air conditioning unit 18 may be adjusted front to back in block 812 to allow the bracket 104 to align with the vertical side window tracks 16. In block 814, once the bracket 104 is extended into the vertical side window tracks 16 so as to provide the resistive support to the torque of the window air conditioning unit 18 and to eliminate any torque load on the window sash 12 caused by the window air conditioning unit 18, the bracket 104 may be affixed to the base 102. In some embodiments, fastener 110 may be used to affix bracket 104 to the base 102. For example, a ½ inch Philips screw may be threaded through one of the plurality of slots 108 of the bracket 104 (one on the left side and one on the right) to lock the bracket 104 to the base 102 that is affixed in the window slot 20 of the window air conditioning unit 18. Upon the completion of the installation step in block 814, the window air conditioning unit 18 is now secured within the window assembly 10. In block 816, the window sash 12 may be closed to rest on the top surface of the sealing member 22 below the top of the overall casing structure. With the anti-tip bracket assembly 100 properly installed, the window assembly 10 may be adjusted between the first position and the second position without disturbing the window air conditioning unit 18.

In some embodiments, the first end 111 is smaller than the second end 113 and is suitable for fitting into the vertical side window track with a smaller width. For example, the first end 111 may be a smaller end that is similar to the second end 113 as shown in FIGS. 4-7, and inserted into the vertical side window track 16 with a width equal or less than ½ inches.

In some embodiments, the first position of the window assembly 10 may be when the window sash 12 is raised outside the window slot 20 and above the overall casing structure of the window air conditioning unit 18, as shown in FIG. 1, and the second position of the window assembly 10 may be when the window sash 12 is lowered inside the window slot 20 and rests on the top surface of the sealing member 22, as shown in FIGS. 2 and 3.

In some embodiments, after placing the window air conditioning unit 18 on the top of the main mounting bracket 24, the window sash 12 may be pulled down into the window slot 20 to help to align the window air conditioning unit 18 in the correct location in block 804. The window sash 12 inserted into the window slot 20 may also help to support the window air conditioning unit 18 during installation.

In some embodiments, as discussed earlier and best shown in FIG. 1A, the bracket 104 may be extended within the pre-formed groove on the top surface of the sealing member 22 in block 810 to avoid changing the appearance of the window air conditioning unit 18, while viewing from the inside of a room.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein, unless characterized otherwise, are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the disclosure to the precise steps and/or forms disclosed, and obviously many modifications and variations are possible in light of the above teaching. It is intended that the scope of the disclosure and all equivalents be defined by the claims appended hereto.

The invention claimed is:

1. A window air conditioning appliance comprising:

a window air conditioning unit having a window slot therewithin separating an indoor portion from an outdoor portion, wherein the window slot is configured to receive at least one vertically operable window sash; and an anti-tip bracket assembly comprising:

at least one bracket including a first end and a second end, wherein the first end and the second end are configured to be received within a vertical side window track to provide support to the window air conditioning unit; and a base received in the window slot of the window air conditioning unit, wherein the first end or the second end of the at least one bracket is adjustably affixed in the base between a first configuration and a second configuration different from the first configuration, wherein when in the first configuration the first end of the at least one bracket is affixed to the base and wherein when in the second configuration the second end of the at least one bracket is affixed to the base.

2. The window air conditioning appliance of claim 1, wherein the at least one bracket has a plurality of slots.

3. The window air conditioning appliance of claim 2, wherein the at least one bracket is affixed in the base via a fastener.

4. The window air conditioning appliance of claim 1, wherein the first end is smaller than the second end and is suitable for fitting into the vertical side window track with a smaller width.

5. The window air conditioning appliance of claim 1, further comprising at least one sealing member.

6. The window air conditioning appliance of claim 5, further comprising at least one side arm coupled to the window air conditioning unit.

7. The window air conditioning appliance of claim 6, wherein the at least one sealing member is coupled to the at least one side arm.

8. The window air conditioning appliance of claim 6, wherein the at least one side arm is rotatably coupled.

9. The window air conditioning appliance of claim 5, wherein the at least one sealing member has a groove on a top surface thereof, and the at least one bracket is extended within the groove.

10. The window air conditioning appliance of claim 5, wherein the at least one sealing member is made from foam.

11. The window air conditioning appliance of claim 1, wherein the base comprises a bracket guide track for slidably receiving the at least one bracket.

12. The window air conditioning appliance of claim 1, further comprising at least one open window bracket.

13. The window air conditioning appliance of claim 12, wherein the at least one open window bracket further comprises a first end for anchoring to an outer casing of the indoor portion and a second end for anchoring to a main mounting bracket.

14. The window air conditioning appliance of claim 12, wherein the at least one open window bracket further comprises a first end for anchoring to an outer casing of the indoor portion and a second end for anchoring to the horizontal windowsill.

15. An anti-tip bracket assembly for securing a window air conditioning unit in a window assembly, the window assembly having at least one vertically operable window sash, a horizontal windowsill, and a first vertical side window track and opposing second vertical side window track, the window air conditioning unit having a window slot therewithin separating an indoor portion from an outdoor portion, wherein the window slot is for receiving the at least one vertically operable window sash, the anti-tip bracket assembly comprising:

a first bracket including a first end and a second end, wherein the first end and the second end are configured to be received within the first vertical side window track to provide support to the window air conditioning unit;

a second bracket including a first end and a second end, wherein the first end and the second end of the second bracket are configured to be received within the second vertical side window track to provide support to the window air conditioning unit; and a base received in the window slot of the window air conditioning unit, wherein the first end or the second end of each one of the first bracket and the second bracket is adjustably affixed in the base between a first configuration and a second configuration different from the first configuration, wherein when in the first configuration the first end of each one of the first bracket and the second bracket is adjustably affixed to the base and wherein when in the second configuration the second end of each one of the first bracket and the second bracket is adjustably affixed to the base.

16. The anti-tip bracket assembly of claim 15, wherein the base includes a first end and an opposing second end, wherein the first end of the base engages the first bracket and the second end of the base engages the second bracket.

17. The anti-tip bracket assembly of claim 15, wherein the first bracket and the second bracket are adjustable affixed relative to the base to change an overall length of the anti-tip bracket.

18. The anti-tip bracket assembly of claim 15, wherein the first end of each one of the first bracket and the second bracket is different than the second end of each one of the first bracket and the second bracket.

19. A window air conditioning appliance comprising:

a window air conditioning unit having a window slot therewithin separating an indoor portion from an outdoor portion, wherein the window slot is configured to receive at least one vertically operable window sash; and an anti-tip bracket assembly comprising:

at least one bracket including a first end and second end, wherein said first end and said second end are configured to be received within a vertical side window track to provide support to the window air conditioning unit;

a base received in the window slot of the window air conditioning unit, wherein the first end or the second end of the at least one bracket is adjustably affixed in said base between a first configuration and a second configuration different from said first configuration, and wherein when in said first configuration said first end of said at least one bracket is adjustably affixed to said base and when in said second configuration said second end of said at least one bracket is adjustably affixed to said base; and wherein the window air conditioning unit is configured to allow the at least one window sash to be adjustable between a first position and a second position.

20. The window air conditioning appliance of claim 19, wherein said first position is when the at least one window sash is outside the window slot and said second position is when the at least one window sash is inside the window slot.

* * * * *